US007944976B2

(12) United States Patent
Koyabu

(10) Patent No.: US 7,944,976 B2
(45) Date of Patent: May 17, 2011

(54) DATA EDITION SYSTEM, DATA EDITION METHOD, DATA PROCESSING DEVICE, AND SERVER DEVICE

(75) Inventor: Kyouhei Koyabu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1562 days.

(21) Appl. No.: 10/559,660

(22) PCT Filed: Jun. 4, 2004

(86) PCT No.: PCT/JP2004/008171
§ 371 (c)(1),
(2), (4) Date: Dec. 5, 2005

(87) PCT Pub. No.: WO2004/110062
PCT Pub. Date: Dec. 16, 2004

(65) Prior Publication Data
US 2006/0149763 A1    Jul. 6, 2006

(30) Foreign Application Priority Data

Jun. 6, 2003 (JP) .................. 2003-162266

(51) Int. Cl.
*H04N 11/02* (2006.01)
*H04N 11/04* (2006.01)
*H04N 7/12* (2006.01)
*H04B 1/66* (2006.01)
*H04N 1/407* (2006.01)
*H04N 1/409* (2006.01)
*G06T 5/00* (2006.01)

(52) U.S. Cl. .................. 375/240.26; 358/3.28; 382/100

(58) Field of Classification Search .................. 358/1.9, 358/3.28; 382/100; 375/240.01, 240.02, 375/240.24, 240.25, 240.26
See application file for complete search history.

(56) References Cited

U.S. PATENT DOCUMENTS

| 7,187,780 B2 * | 3/2007 | Tian et al. ..................... 382/100 |
| 2003/0161468 A1 * | 8/2003 | Iwagaki et al. ............... 380/201 |
| 2006/0001912 A1 * | 1/2006 | Miyashita .................... 358/3.28 |

FOREIGN PATENT DOCUMENTS

| JP | 8-111870 | 4/1996 |
| JP | 2001-157179 | 6/2001 |
| JP | 2001-169278 | 6/2001 |
| JP | 2002-297628 | 10/2002 |

* cited by examiner

*Primary Examiner* — James A Thompson
(74) *Attorney, Agent, or Firm* — Oblon, Spivak, McClelland, Maier & Neustadt, L.L.P.

(57) ABSTRACT

This invention proposes arrangements for implementing processes free of signal degradation without entailing increased strains on transmission. Parameter information such as compression, decoding and editing parameters is stored in a database in correspondence with unique information (UMID). Material data (baseband signal) decoded (from compression) for editing purposes is supplemented with the unique information when transmitted. Where the material data is to be edited or re-encoded, the parameter information about the processes performed previously on the data in question is acquired from the database using the unique information as the key, so that the data is subjected to degradation-free signal processing in reference to the acquired parameter information.

15 Claims, 11 Drawing Sheets

F I G . 8
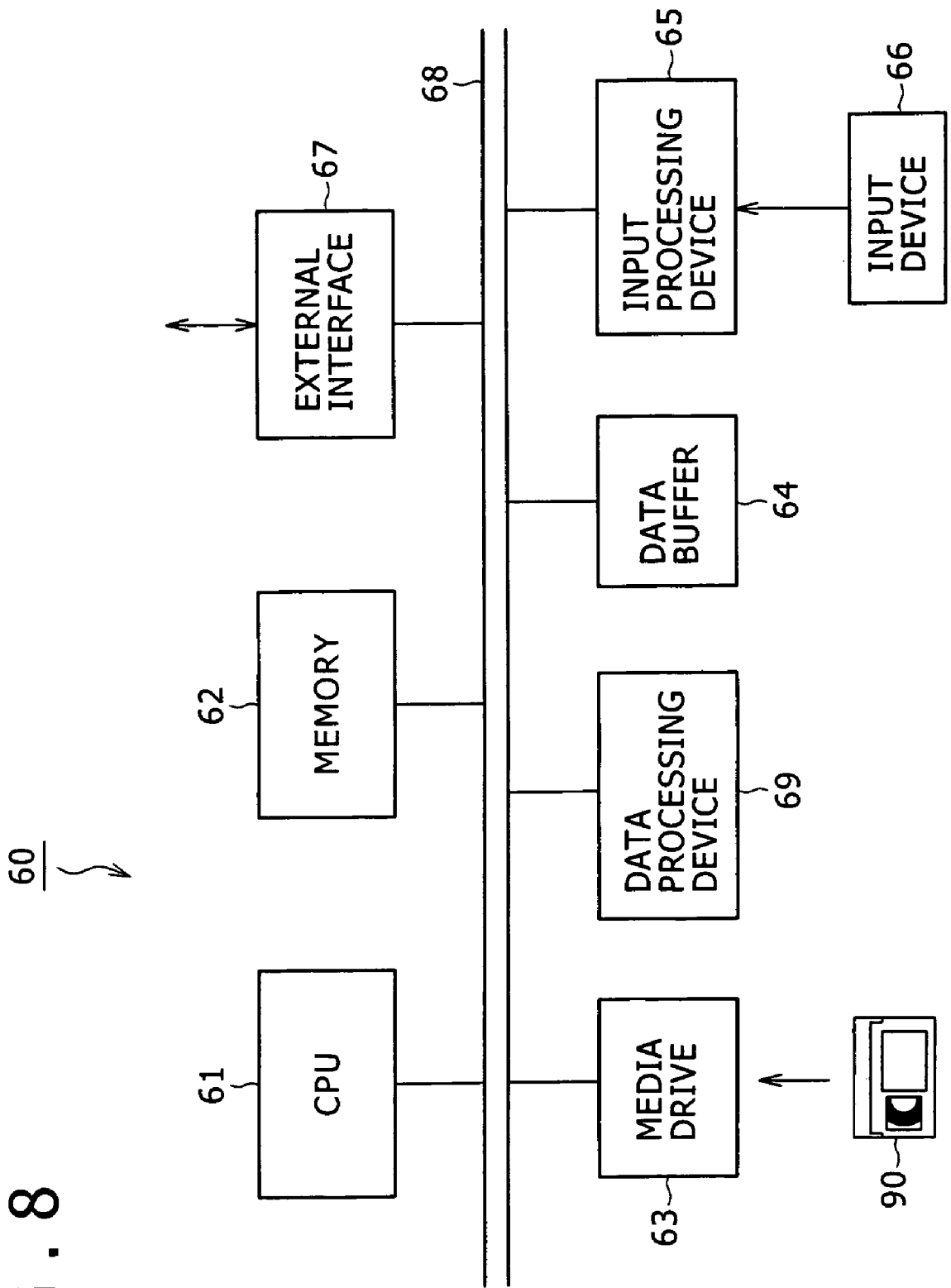

DATA EDITION SYSTEM, DATA EDITION METHOD, DATA PROCESSING DEVICE, AND SERVER DEVICE

TECHNICAL FIELD

The present invention relates to a data editing system and a data editing method for editing video signals (video material data) picked up by means of a video camera or like equipment, as well as to a data processing apparatus and a server apparatus for carrying out processes constituting the data editing system.

BACKGROUND ART

It is common knowledge that metadata defined illustratively in SMPTE 298M or 335M (Society of Motion Picture and Television 298M, 335M) is used as supplementary data added to video and audio signals picked up by video cameras or the like (referred to as video and audio materials, or called material data collectively hereunder).

The metadata is made up of diverse kinds of information about material data, such as titles of video and audio materials, types of the titles, scene numbers, take numbers, and video sources (e.g., video camera); attributes associated with the material data such as storage locations and sizes; and contents of the materials.

When prepared for transmission, the metadata is written into a user data word (UDW) allocated in an ancillary data packet ANC in SDI (serial digital data interface) format.

The above-mentioned metadata includes ID (unique ID information) defined in ISO (International Organization for Standardization)/SMPTE 330M. The ID information is defined as UMID (Unique Material Identifier) that identifies each item of material data in a manner that is unique in the world. When used as the globally unique ID for each material data item, the UMID is quite effective in searching for and matching desired material data.

Japanese Patent Laid-Open No. 2002-297628 discloses a technique of searching for information by effectively utilizing UMID.

The material data obtained by means of a video camera or like equipment is finished usually as a single video content following various editing processes. That is, after the pick-up by the video camera or the like, the material data undergoes such diverse processes as encoding, decoding, editing, and re-encoding.

Japanese Patent Laid-Open No. 2000-59788 discloses a technique of utilizing the compression parameter destined for encoding in such a manner as to minimize the degradation in picture quality that may occur during re-encoding.

Compressed material data is edited usually in the following sequence: compressed material data is first provided by the video camera or the like. At the editing stage, the compressed material data is decoded into a baseband signal. The material data is then edited in the baseband signal format. Thereafter, the signal is re-encoded to restore the compressed material data.

The processes involved are repetitive: the material data is first decoded for editing purposes. After the editing, the data is again encoded. The process iterations tend to degrade picture quality. This is the problem that is supposed to be suppressed by the technique disclosed in Japanese Patent Laid-Open No. 2000-59788. More specifically, the disclosed technique involves adding the compression parameter destined for initial encoding to the material data that is transmitted. After the transmission and subsequent editing, the material data is suitably processed when again encoded using the compression parameter employed during the initial encoding, whereby the degradation in picture quality is prevented.

To let previous processing parameters be known requires transmitting material data together with its corresponding processing parameters used in the past. Adding any processing parameters to the material data destined for transmission signifies an increase in the amount of data to be sent. Conversely, to suppress the increase in data size requires minimizing the processing parameters to be added to the data, which inevitably results in a deterioration in picture quality.

Adding the past processing parameters to the material data to be transmitted permits subsequent data processing with a minimum of picture data degradation. But this procedure necessarily entails an increased load on the process of data transmission. On the other hand, attempts to reduce the burdens on data transmission involve adding as few processing parameters as possible to the target data, which leads to diminished effectiveness in preventing picture quality deterioration.

DISCLOSURE OF INVENTION

The present invention has been made in view of the above circumstances and provides arrangements for allowing various processing devices to optimally process material data being edited by the use of previous processing parameters while minimizing any increase in the strains on transmitting the material data.

According to one embodiment of the present invention, there is provided a data editing system including: decoding means for decoding encoded material data into decoded material data while extracting additional information from the encoded material data, before extracting unique information from the extracted additional information in order to output a signal constituted by the decoded material data supplemented with the unique information; database means for storing into a database the unique information in correspondence with predetermined processing parameter information; and editing means for performing predetermined editing on the signal output by the decoding means while acquiring from the database means the processing parameter information corresponding to the unique information for use in the editing.

A preferred structure of the above data editing system embodying the present invention may further include encoding means for encoding the signal edited by the editing means and supplemented with the unique information, while acquiring from the database means the processing parameter information corresponding to the unique information for use in the encoding.

According to another embodiment of the present invention, there is provided a data editing method including the steps of: decoding encoded material data into decoded material data while extracting additional information from the encoded material data, before extracting unique information from the extracted additional information in order to output a signal constituted by the decoded material data supplemented with the unique information; storing into a database the unique information in correspondence with predetermined processing parameter information; and performing predetermined editing on the signal output in the decoding step while acquiring from the database the processing parameter information corresponding to the unique information for use in the editing.

A preferred variation of the above data editing method embodying the present invention may further include the step of encoding the signal edited in the editing step and supplemented with the unique information, while acquiring from the database the processing parameter information corresponding to the unique information for use in the encoding.

In other preferred variations of the above data editing method, the processing parameter information which corresponds to the unique information and which is stored in the database may be a compression parameter previously included as the additional information extracted by the decoding means, a decoding parameter used in the decoding performed by the decoding means, or an editing parameter used in the editing performed by the editing means.

Where the inventive data editing system and data editing method above are in use, processing parameter information such as compression, decoding and editing parameters is stored in the database in correspondence with unique information. The unique information constitutes information that can identify material data uniquely (e.g., UMID).

According to the present invention, the material data decoded (e.g., into the baseband signal) for editing purposes is supplemented with the corresponding unique information.

Where the material data is to be edited or re-encoded, the inventive arrangements above make it possible to retrieve from the database the parameter information regarding the processes performed in the past on the data in question, the retrieval being carried out using the corresponding unique information as the key.

According to a further embodiment of the present invention, there is provided a data processing apparatus including: extracting means for extracting additional information from encoded material data; decoding means for decoding the encoded material data into decoded material data; decoded data outputting means for outputting the decoded material data supplemented with unique information included in the additional information extracted by the extracting means; and parameter outputting means for outputting to an external server the unique information together with either processing parameter information included in the additional information extracted by the extracting means or processing parameter information used in the decoding performed by the decoding means.

The above data processing apparatus of the invention implements structurally the decoding means of the inventive data editing system. Furthermore, the data processing apparatus implements operationally the decoding step of the inventive data editing method.

According to an even further embodiment of the present invention, there is provided a data processing apparatus including: decoded data editing means for editing decoded data supplemented with unique information; unique information outputting means for outputting the unique information to an external server in order to acquire processing parameter information therefrom for use in the editing performed by the decoded data editing means; and parameter inputting means for inputting the processing parameter information from the external server in correspondence with the unique information output by the unique information outputting means in order to supply the processing parameter information to the decoded data editing means.

A preferred structure of the above data processing apparatus embodying the present invention may further include parameter outputting means for outputting to the external server the unique information together with the processing parameter information for use in the editing performed by the decoded data editing means.

The above data processing apparatus of the invention implements structurally the editing means of the inventive data editing system. Furthermore, the data processing apparatus implements operationally the editing step of the inventive data editing method.

According to a still further embodiment of the present invention, there is provided a data processing apparatus including: decoded data editing means for editing decoded data supplemented with unique information; unique information outputting means for outputting the unique information to an external server in order to acquire processing parameter information therefrom for use in the editing performed by the decoded data editing means; and parameter inputting means for inputting the processing parameter information from the external server in correspondence with the unique information output by the unique information outputting means in order to supply the processing parameter information to the decoded data editing means.

The above data processing apparatus of the invention implements structurally the encoding means of the inventive data editing system. Furthermore, the data processing apparatus implements operationally the encoding step of the inventive data editing method.

According to a yet further embodiment of the present invention, there is provided a server apparatus including: database means; storing means for storing into the database means unique information supplied from an external device in correspondence with processing parameter information; searching means for searching the database means based on the unique information supplied from the external device; and parameter outputting means for outputting to the external device the processing parameter information acquired through the search performed by the searching means based on the unique information.

The above server apparatus of the invention implements structurally the database means of the inventive data editing system. Furthermore, the data processing apparatus above carries out parameter searches for the database storing step, editing step, or encoding step of the inventive data editing method.

BRIEF DESCRIPTION OF DRAWINGS

FIG. 8 is a block diagram of a decoding/encoding apparatus implementing an edit-use decoding device and an edit-use encoding device in the editing apparatus of the embodiment;

BEST MODE FOR CARRYING OUT THE INVENTION

Figure 1:
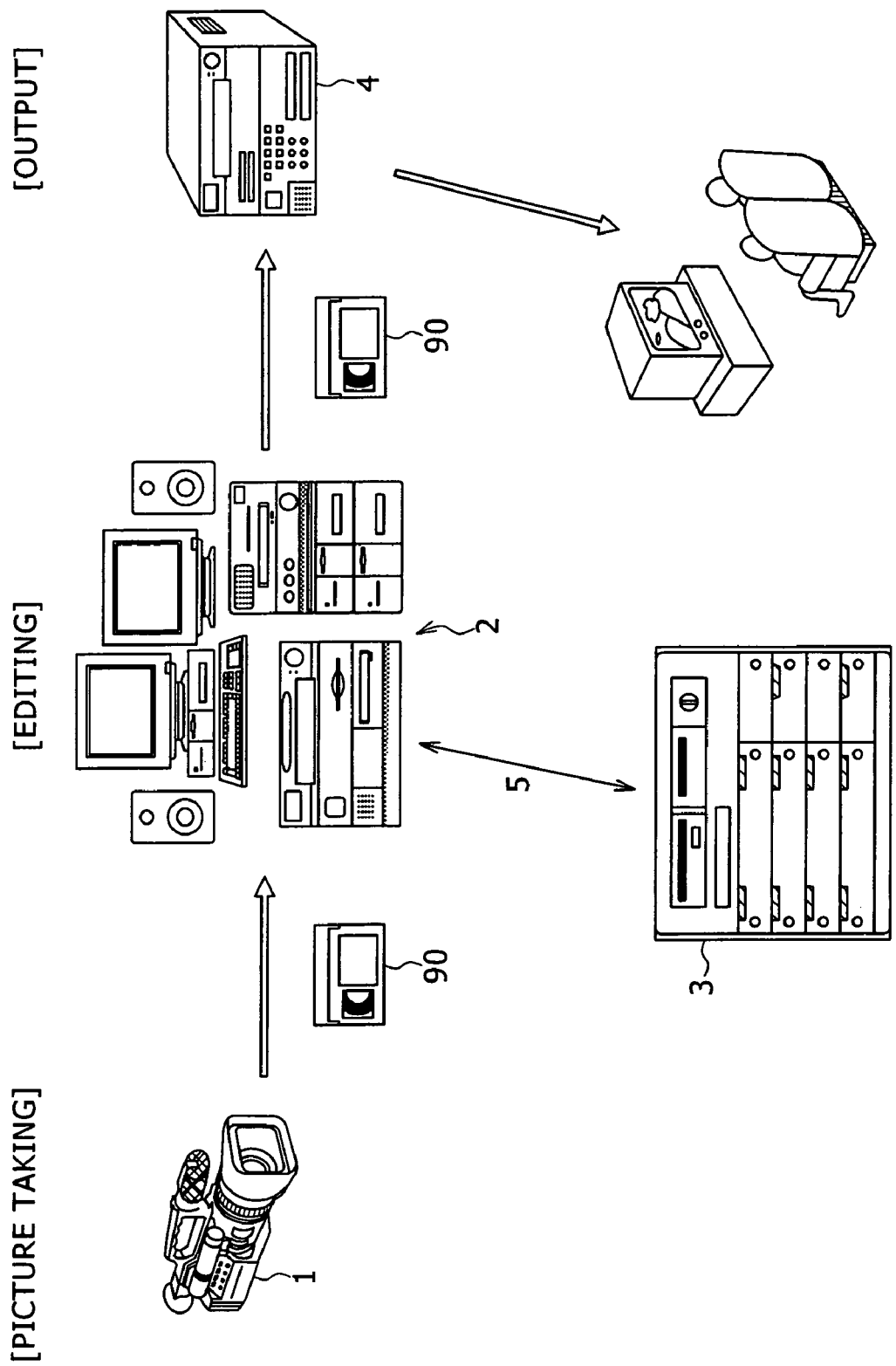
FIG. 1 is an explanatory view of an editing system practiced as an embodiment of the present invention.

The description of how the present invention is preferably carried out will be given under the following headings:
1. Overview of the editing system
2. Functional structure of the editing system
3. Structure of the image pickup apparatus and metadata for use therewith
4. Hardware structure of the editing apparatus
5. Hardware structure and database of the server
6. System operations

1. Overview of the Editing System

FIG. 1 schematically shows an editing system practiced as one embodiment of the present invention. An image pickup apparatus 1 takes pictures to obtain material data in the form of video and audio data. The image pickup apparatus 1 records the acquired material data to recording media 90 such as magnetic tapes or optical disks.

The image pickup apparatus 1 records metadata along with the material data to the recording media 90, as will be discussed later in more detail.

The metadata, as mentioned earlier, is supplementary data added to video and audio signals picked up by a video camera or like image pickup apparatus. Illustratively, the metadata is defined in SMPTE 298M, 335M (Society of Motion Picture and Television 298M, 335M).

The inventive system takes full advantage of UMID, which is one variety of metadata. The image pickup apparatus 1 compresses videos signals before recording them to the recording media 90. The parameter for use in the compression encoding (the parameter is called the compression parameter hereunder) is one item of metadata. This system illustratively allows an editing apparatus 2 to reference the compression parameter during processing.

Pieces of the recording media 90 on which the material data is recorded in compressed format by the image pickup apparatus 1 are handed over to the editing apparatus 2. The editing apparatus 2 references the recording media 90 as needed while performing editing work.

Although FIG. 1 shows only one editing apparatus 2, this is not limitative of the invention. In practice, video materials may be edited a number of times consecutively by different editing apparatuses. Alternatively, the same video material may be edited parallelly by a plurality of editing apparatuses.

A server 3 is capable of data communication with the editing apparatus 2 over a transmission channel 5. In particular, the server 3 has a database that stores various parameters including the above-mentioned compression parameter in correspondence with UMID added to material data.

In operation, the server 3 stores data into the database and performs searches through it while communicating with the editing apparatus 2.

The transmission channel 5 may illustratively be part of a LAN (local area network) allowing the server 3 to communicate with a personal computer or a workstation constituting the editing apparatus 2. Alternatively, the transmission channel 5 may be a USB or a SCSI arrangement for connecting to the editing apparatus 2.

As another alternative, the transmission channel 5 may be part of a network such as the Internet letting the editing apparatus 2 gain access to the server 3 on websites.

That is, the server 3 may be practiced in any form as long as it can be accessed by the editing apparatus 2. Likewise the transmission channel 5 may be implemented in any of diverse forms including LANs, peripheral device communication channels, public circuits, dedicated circuits, satellite communication likes, or wireless transmission channels.

The pictures edited by the editing apparatus 2 and finished illustratively as video signals constituting video content are sent to an output apparatus 4. In turn, the output apparatus 4 offers users (i.e., viewers) the content in the form of TV broadcasts, recording media, or downloads.

2. Functional Structure of the Editing System

A functional structure of the editing system and that of the editing apparatus 2 and server 3 in particular will now be described with reference to FIGS. 2 and 3. FIG. 3 shows typical functions which may be implemented by the apparatuses involved illustratively by the use of software (hardware may also be utilized).

Figure 2:
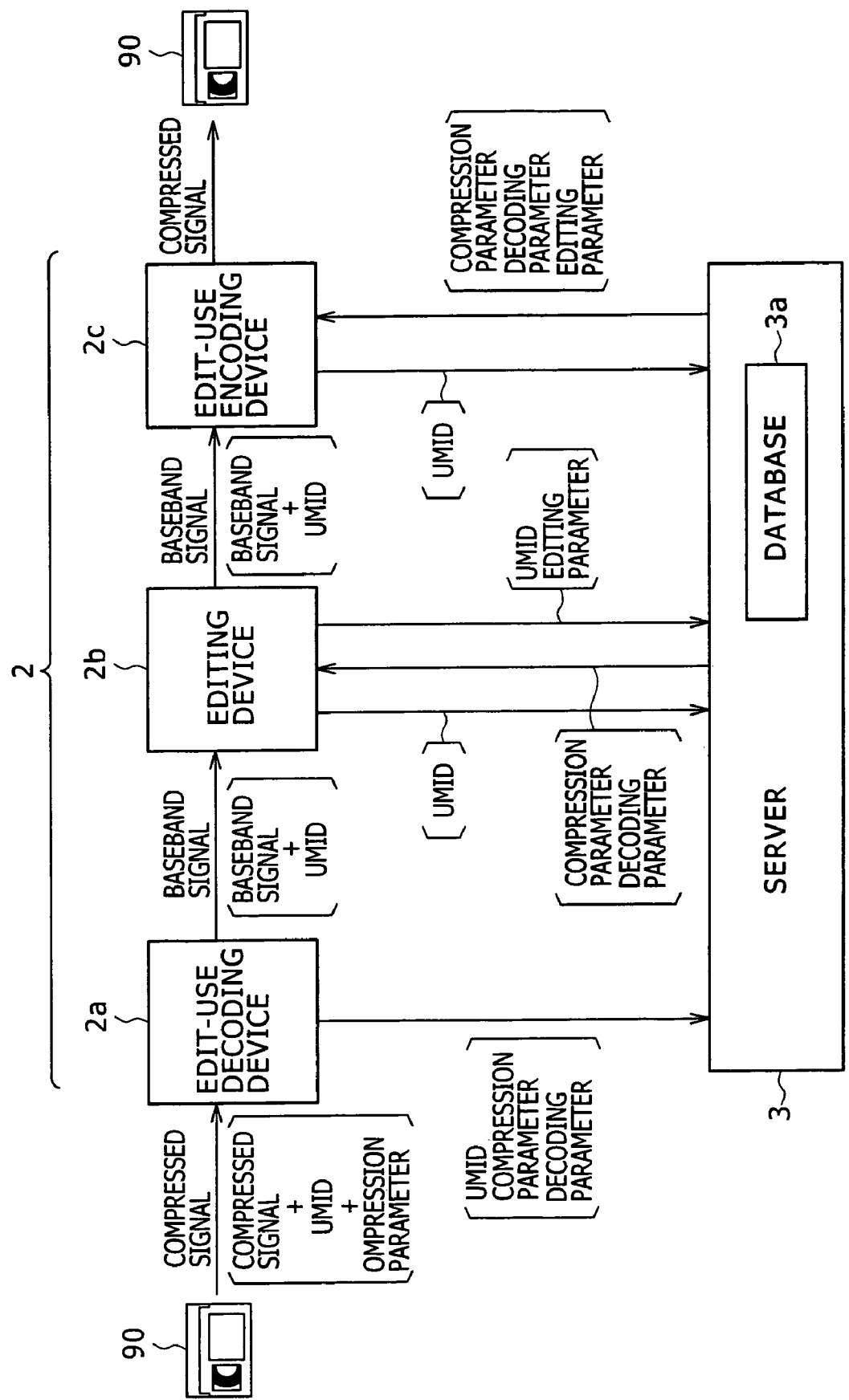
FIG. 2 is an explanatory view of an editing apparatus and a server in the embodiment.
Figure 3:
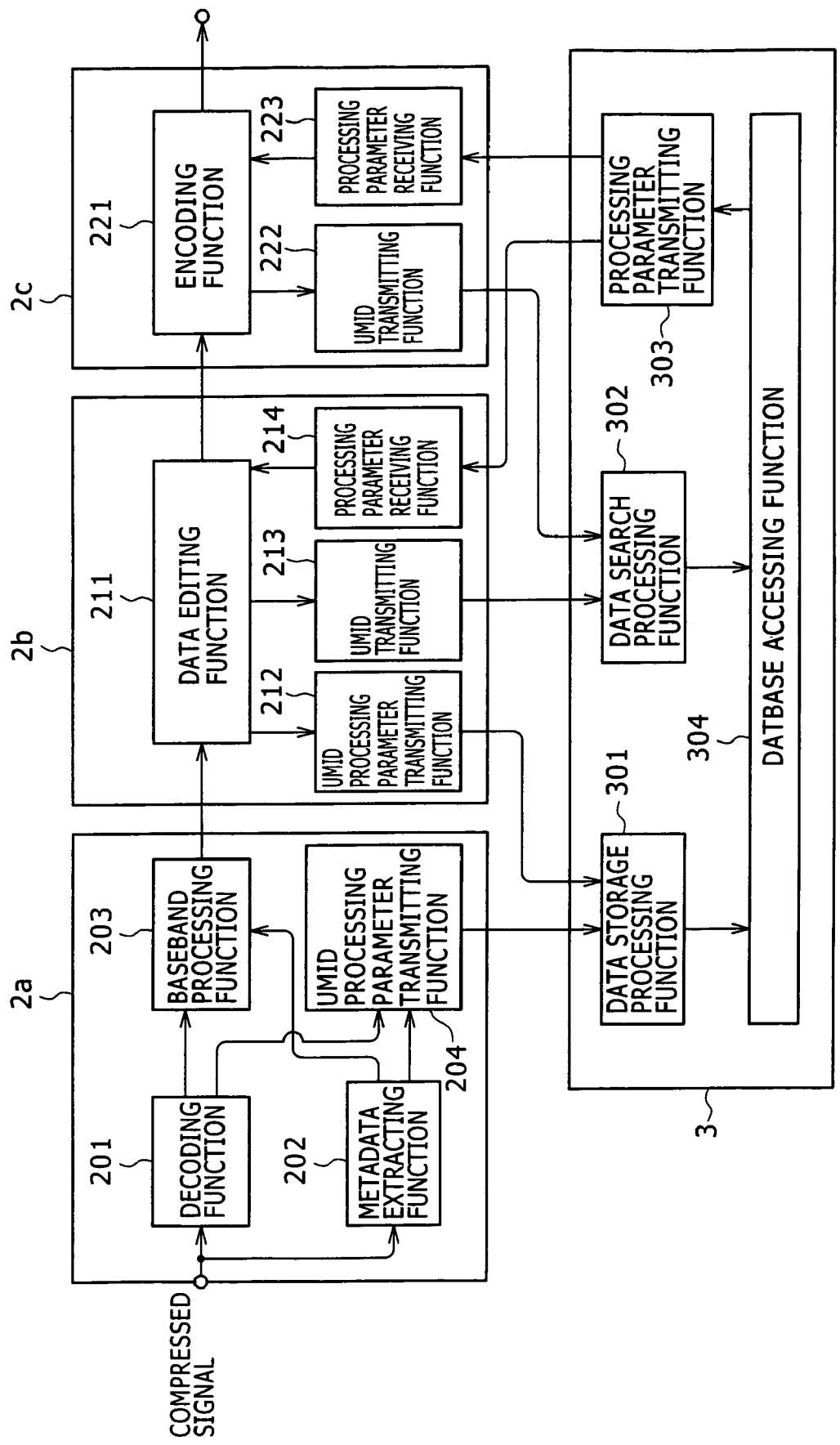
FIG. 3 is an explanatory view showing function blocks of the editing apparatus and server in the embodiment.

As shown in FIG. 2, the editing apparatus 2 has an edit-use decoding device 2a, an editing device 2b, and an edit-use encoding device 2c. The server 3 has a database 3a.

As indicated in FIG. 2, a piece of the recording media 90 supplies the edit-use decoding device 2a with a compressed signal supplemented with metadata coming from the image pickup apparatus 1. The compressed signal is made up of compressed material data (video and audio) and is supplemented with metadata. Each item of metadata includes UMID and a compression parameter. As mentioned above, the compression parameter is a parameter that was used by the image pickup apparatus 1 during its compressing process.

With the piece of recording media 90 subjected to a reproducing process, the edit-use decoding device 2a of the editing apparatus 2 acquires from the media a compressed signal supplemented with metadata.

The edit-use decoding device 2a decodes the compressed signal that is input to the editing apparatus 2. More specifically, the edit-use decoding device 2a decodes the compressed signal through decompression into a baseband signal. The baseband signal is supplemented with UMID derived from the metadata, before being sent to the editing device 2b. At the same time, the UMID, and the compression parameter or a decoding parameter for use by the edit-use decoding device 2a during decoding, or both the compression and the decoding parameters, are fed to the server 3. As shown in FIG. 3, the edit-use decoding device 2a includes a decoding function 201, a metadata extracting function 202, a baseband processing function 203, and a UMID/parameter transmitting function 204.

The decoding function 201 performs a decoding process on the compressed signal that is input.

The metadata extracting function 202 extracts metadata from the compressed signal that is input. Furthermore, the metadata extracting function 202 extracts the UMID and compression parameter from inside the metadata.

The baseband processing function 203 performs processes preparatory to transferring to the editing device 2b the baseband signal that has been obtained by the decoding function 201. At this point, the baseband processing function 203 adds to the baseband signal only the UMID out of the metadata extracted by the metadata extracting function 202. Illustratively, the UMID is embedded into an ancillary segment of the baseband signal. The baseband processing function 203 outputs the UMID-supplemented baseband signal to the editing device 2b.

The UMID/parameter transmitting function 204 transmits to the server 3 the UMID in correspondence with various parameters for storage into the database. Of the metadata extracted by the metadata extracting function 202, the UMID and the corresponding compression parameter are paired to make up outgoing information to be transmitted. The parameter used during decoding by the decoding function 201 may also be included in the outgoing information.

As shown in FIG. 2, the editing device 2*b* is supplied with the UMID-supplemented baseband signal from the edit-use decoding device 2*a*.

The editing device 2*b* performs predetermined editing processes on the baseband signal, and gains access to the server 3.

The capabilities of the editing device 2*b* are implemented by means of a data editing function 211, a UMID/parameter transmitting function 212, a UMID transmitting function 213, and a parameter receiving function 214, as shown in FIG. 3.

The data editing function 211 performs diverse processes on the baseband signal, such as signal processing including color adjustment and brilliance control, cuts, composites, inserts, special visual effects, voice-overs, and other editing work necessary for producing video contents. After the editing, the data editing function 211 outputs the UMID-supplemented baseband signal to the edit-use encoding device 2*c*.

The UMID/parameter transmitting function 212 transmits to the server 3 the UMID attached to the baseband signal, in correspondence with editing parameters used during the processing by the data editing function 211 for storage into the database of the server. The editing parameters include any new parameter to be established for editing, as well as a parameter for changing or invalidating the compression parameter used in the previous compression or the decoding parameter for use upon decoding.

The UMID transmitting function 213 transmits the UMID added to the baseband signal to the server 3 for searches through the database therein.

The parameter receiving function 214 receives the parameters (e.g., compression and decoding parameters) derived from the search through the database of the server 3 based on the UMID sent by the UMID transmitting function 213. The received parameters are handed over to the data editing function 211. This enables the data editing function 211 to perform an editing process on the target baseband signal by employing the parameters used during the previous compression or decoding of the signal.

As shown in FIG. 2, the edit-use encoding device 2*c* is supplied with the UMID-supplemented baseband signal from the editing device 2*b* as a result of the latter's editing process.

The edit-use encoding device 2*c* performs recompression encoding on the edited baseband signal. The compressed signal derived from the recompression is illustratively written to the recording media 90 that may be offered to an external apparatus such as the output apparatus 4 in FIG. 1 or to another editing apparatus 2.

The edit-use encoding device 2*c* further gains access to the server 3. This feature is implemented by means of an encoding function 221, a UMID transmitting function 222, and a parameter receiving function 223 of the edit-use encoding device 2*c*, as depicted in FIG. 3.

The encoding function 221 is a function that performs compression encoding on the baseband signal so as to acquire a recompressed signal therefrom.

The UMID transmitting function 222 transmits the UMID attached to the baseband signal to the server 3 for searches through the database therein.

The parameter receiving function 223 receives the parameters (e.g., compression parameter, decoding parameter, editing parameter) derived from the search through the database in the server 3 based on the UMID sent from the UMID transmitting function 222. The received parameters are handed over to the encoding function 221. This enables the encoding function 221 to perform an editing process on the target baseband signal by employing the parameters used during the previous compression, decoding, or editing of the signal.

As indicated in FIG. 2, the server 3 has the database 3*a*. The server 3 is accessed by the editing apparatus 2 (made up of the edit-use decoding device 2*a*, editing device 2*b*, and edit-use encoding device 2*c*). Depending on the nature of the access, the server 3 stores data into the database or searches through it for data retrieval.

These features are implemented by means of a data storage processing function 301, a data search processing function 302, a parameter transmitting function 303, and a database accessing function 304 in the server 3.

The database accessing function 304 accesses a mass storage medium such as a HDD constituting the database 3*a* to write or read data thereto or therefrom. That is, the database accessing function 304 performs actual operations to store data into the database 3*a* or to search through it for data retrieval.

The data storage processing function 301 carries out processes for storing data into the database.

For example, the information sent from the UMID/parameter transmitting function 204 of the edit-use decoding device 2*a* (i.e., the UMID, compression parameter and decoding parameter) is stored by the data storage processing function 301. More specifically, the data storage processing function 301 matches the compression and decoding parameters with the corresponding UMID to prepare the data to be stored, and transfers the prepared data to the database accessing function 304. In turn, the database accessing function 304 stores the compression and decoding parameters into the database 3*a* in correspondence with the UMID.

The information sent from the UMID/parameter transmitting function 212 of the editing device 2*b* (i.e., the UMID and editing parameter) is also processed by the data storage processing function 301. More specifically, the data storage processing function 301 matches the editing parameter with the corresponding UMID to prepare the data to be stored, and transfers the prepared data to the database accessing function 304. In turn, the database accessing function 304 stores the editing parameter into the database 3*a* in correspondence with the UMID.

The data search processing function 302 performs processes for searches through the database. The parameter transmitting function 303 carries out processes for transmitting the result of the search through the database.

For example, the UMID sent from the UMID transmitting function 213 of the editing device 2*b* or from the UMID transmitting function 222 of the edit-use encoding device 2*c* is processed as retrieved information by the data search processing function 302. The information thus processed is handed over to the database accessing function 304 as the key for search. In turn, the database accessing function 304 searches through the database 3*a* based on the UMID as the key, and extracts the corresponding parameters from the database.

The extracted parameters are transferred to the parameter transmitting function 303. The parameter transmitting function 303 transmits the received parameters to the editing device 2*b* or to the edit-use encoding device 2*c* having made the search request.

3. Structure of the Image Pickup Apparatus and Metadata for use Therewith

Below is a description of what constitutes the editing system of the invention implementing the above-described functions. First to be described is a typical structure of the image pickup apparatus 1 for offering compressed signals to the inventive editing system, as well as metadata for use with the apparatus.

Figure 4:
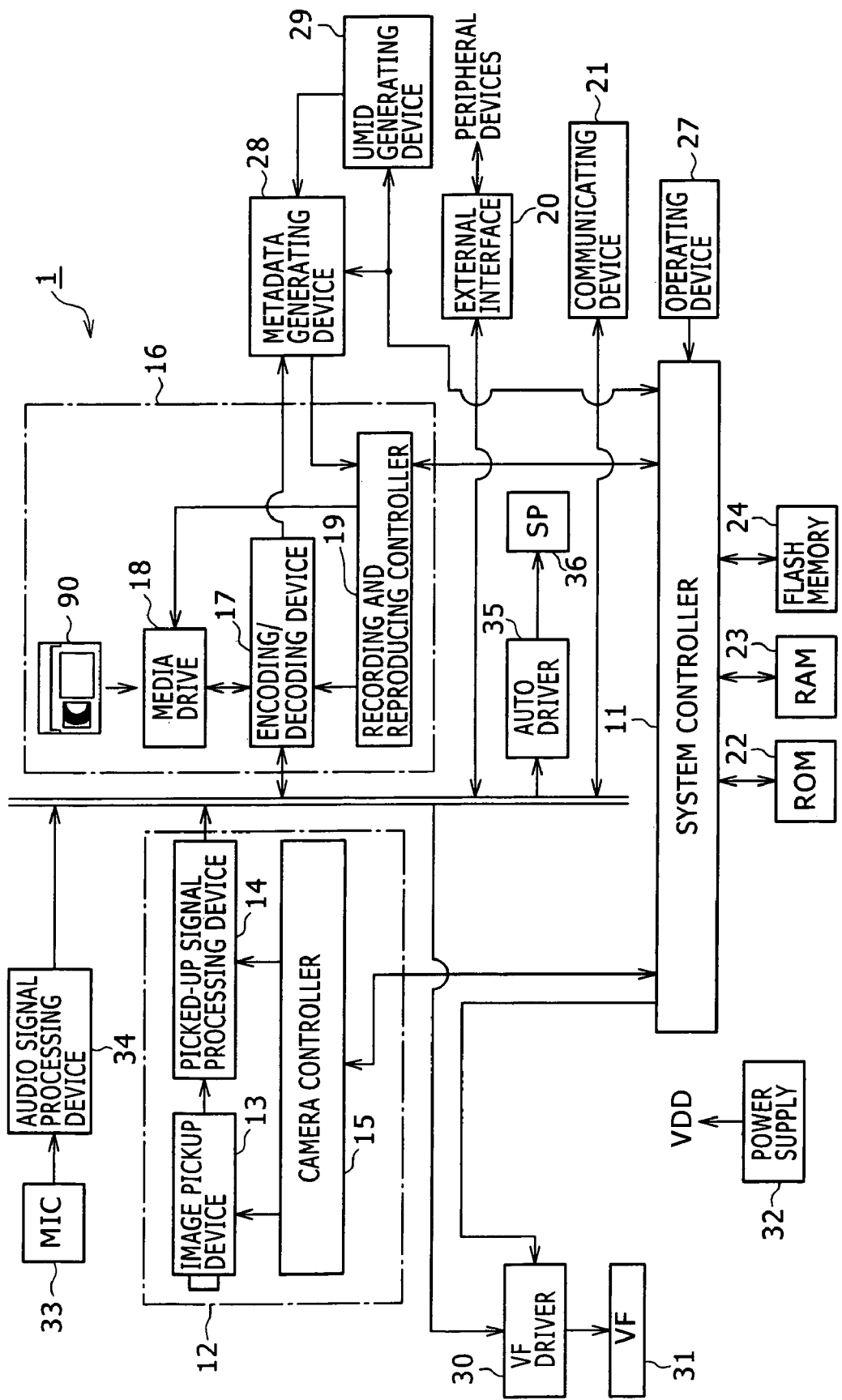
FIG. 4 is a block diagram of an image pickup apparatus supplying a compressed signal to the editing system embodying the present invention.

FIG. 4 is a block diagram of the image pickup apparatus 1. A system controller 11 composed of a microcomputer controls the image pickup apparatus 1 as a whole. Under control of the system controller 11 are the following components:

A camera device 12 is designed to take pictures. It has an image pickup device 13, a picked-up signal processing device 14, and a camera controller 15.

The image pickup device 13 includes a lens block, a drive block and a CCD (charge coupled device). The lens block is made up of picture-taking lenses, an iris, and other parts. The drive block is designed to drive the lens block in focusing and zooming operations. The CCD detects the light picked up by the lens block and subjects the detected light to photoelectric conversion, thereby generating a pickup signal.

The picked-up signal processing device 14 has a sample-and-hold/AGC (automatic gain control) circuit that performs gain control and waveform shaping on the signal gained by the CCD of the image pickup device 13. A video A/D converter is also included in the picked-up signal processing device 14. These components combine to generate digital video data representative of the pictures taken.

The camera controller 15 under instructions from the system controller 11 controls the operation of the image pickup device 13 and that of the picked-up signal processing device 14. Illustratively, the camera controller 15 causes the image pickup device 13 to execute automatic focusing, automatic exposure/aperture control, and zooming (i.e., through motor control).

The camera controller 15 has a timing generator. A timing signal generated by the timing generator allows the CCD and the sample-and-hold/AGC circuit and video A/D converter in the picked-up signal processing device 14 to carry out signal processing operations.

The camera device 12 of the above-described structure generates the video data representing the pictures taken.

An audio signal picked up by a microphone 33 is subjected to A/D conversion by an audio signal processing device 34. The conversion generates audio data in synchronism with the picked-up video data.

A recording and reproducing device 16 writes and reads the video data picked up by the camera device 12 (as well as audio data obtained by the microphone 33) to and from the recording media 90.

The recording and reproducing device 16 has an encoding/decoding device 17, a media drive 18, and a recording and reproducing controller 19.

The encoding/decoding device 17 performs compression encoding on the video data picked up by the camera device 12 as well as on the audio data while pictures are being taken, and converts the data into a format ready for recording to the recording media 90. Furthermore, the encoding/decoding device 17 inserts metadata into recorded signals.

The encoding methods that may be used include those under the MPEG (Moving Picture Experts Group) and JPEG (Joint Photographic Experts Group) standards. Other compression methods may alternatively be utilized where appropriate.

The picked-up video data (as well as audio data) encoded by the encoding/decoding device 17 is supplied to the media drive 18. The media drive 18 writes the supplied data to the loaded piece of recording media 90.

The data written to the recording media 90, i.e., a compressed signal made up of the video and audio data and metadata, is brought to the editing apparatus 2 on a vehicle that is the media 90 on which the signal is recorded, as shown illustratively in FIG. 1.

Obviously, if the piece of recording media 90 loaded in the image pickup apparatus 1 is a magnetic tape cassette, then the media drive 18 is a tape recording and reproducing device; if the loaded piece of recording media 90 is an optical disk, then the media drive 18 is a disk recording and reproducing device.

The video data (as well as audio data) reproduced from the recording media 90 by the media drive 18 is decoded by the encoding/decoding device 17. The decoding process corresponds illustratively to the encoding of the data in question performed at the time of recording.

The recording and reproducing controller 19 under instructions from the system controller 11 controls the processing of the encoding/decoding device 17, the recording and reproducing operations of the media drive 18, and data input and output operations.

The video data picked up by the camera device 12 while taking pictures or the video data reproduced from the recording media 90 may be displayed on a view finder 31.

The video data being output by the camera device 12 which is currently taking pictures or in standby mode is supplied to a view finder driver 30.

Under control of the system controller 11, the view finder driver 30 causes the view finder 31 to display the pictures taken represented by the picked-up video data. Also under instructions from the system controller 11, the view finder driver 30 may overlay a predetermined character image on the currently appearing display.

The video data reproduced from the recording media 90 by the media drive 18 is supplied to the view finder driver 30. Under instructions from the system controller 11, the view finder driver 30 causes the view finder 31 to display the supplied video data as well as any overlaid character image.

By looking into the view finder 31, the picture-taking user (e.g., cameraman) can monitor what is being taken of the subject in standby or picture-taking mode, check the pictures having been recorded to the recording media 90, or perform simple editing operations.

The audio data reproduced from the recording media 90 is converted from digital to analog format by an audio driver 35 before being subjected to signal processing such as filtering and amplification. The audio data thus processed is output from speakers 36.

An external interface 20 permits input and output of audio and other data between the image pickup apparatus and external devices such as audio/visual equipment, information technology devices, and storage devices.

A communicating device 21 illustratively provides wired or wireless network communications. Typically, the communicating device 21 is constituted by a modem Ethernet interface or by a mobile phone interface.

Diverse forms of data communication are implemented when the communicating device 21 or external interface 20 establishes wired or wireless connection with its communicating party.

With the communicating device 21 or external interface 20 installed as described above, the image pickup apparatus 1 connects illustratively to the editing apparatus 2 via a network or through an interface cable. The connection enables the image pickup apparatus 1 to send video and other data in the above-described compressed form to the editing apparatus 2.

Whether incorporated in the image pickup apparatus 1 or connected as a separate entity to the apparatus 1, the communicating device 21 allows the apparatus 1 to conduct network communications. The connecting device 21 also permits the image pickup apparatus 1 to access the server 3.

A ROM 22, a RAM 23 and a flash memory 24 are each used by the system controller 11 as an area in which to hold necessary data or programs or to carry out arithmetic operations.

For example, the ROM 23 accommodates processing programs and fixed data for use by the system controller 11. The RAM 23 is used as a temporary storage area or a work area. The flash memory 24 is arranged to store various control coefficients, among others.

An operating device 27 is provided with various operational elements for carrying out power on/off, picture-taking, reproducing, zooming, and mode switching operations as well as elements for performing editing work for the image pickup apparatus 1.

The system controller 11 detects the user's operations made on these elements, and causes the relevant devices to carry out the operations reflecting the user's intentions.

A power supply 32 uses illustratively a DC/DC converter to supply circuits with necessary levels of power tapped from a built-in battery as a DC source or from a DC supply derived from a commercial AC power source by means of a power supply adapter. The power from the power supply 32 is turned on and off by the system controller 11 in response to the power-related operations performed on the operating device 27.

It was mentioned above that metadata is inserted into the video data recorded by the recording and reproducing device 16. The metadata inserting feature is implemented by a UMID generating device 29 and a metadata generating device 28 in the image pickup apparatus 1.

The UMID generating device 29 generates UMID, i.e., information unique to material data, under control of the system controller 11. Typical structures of UMID will be described later. The UMID is generated illustratively on the basis of time-of-day information or GPS information.

The metadata generating device 28 generates metadata through the use of the data and parameters supplied from the system controller 11, of the UMID from the UMID generating device 29, or of the compression parameter used for compression encoding by the encoding/decoding device 17. The metadata thus generated is fed to the recording and reproducing controller 19. Thereafter, the metadata is inserted into the data being encoded by the encoding/decoding device 17 into a write-ready format.

Figure 5:
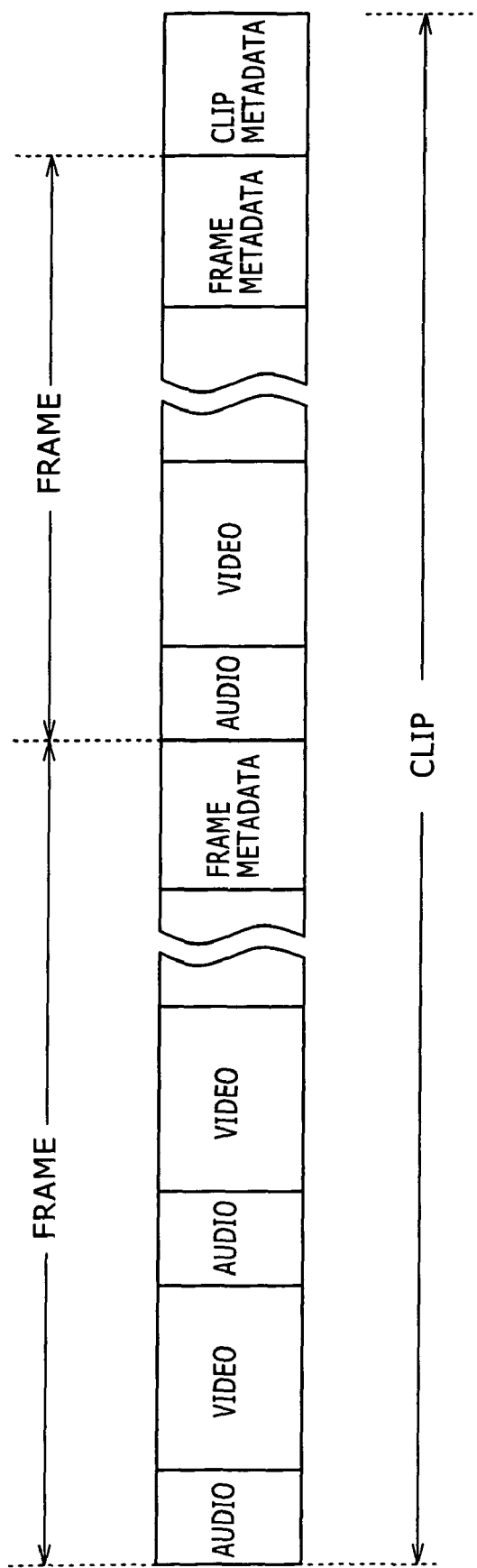
FIG. 5 is an explanatory view illustrating metadata attached to the compressed signal of the embodiment.

On the recording media 90, a compressed signal is written illustratively as shown in FIG. 5. In FIG. 5, a frame is a single picture constituting part of a GOP (group of pictures). A clip refers to a set of AV data as material data ranging from start to end of a single recording session undertaken by the image pickup apparatus 1 (e.g., a series of video data made up of GOPs).

As illustrated, frame metadata is added to each frame composed of audio and video data. Clip metadata is inserted to each clip made up of a plurality of frames.

What follows is a description of metadata. The metadata in this context includes KLV (key length value) metadata attached to each frame, GPS (global positioning system) information representing the location where pictures were taken by the video camera, the time of day (year, month, day, hours, minutes, seconds) at which the picture-taking took place, ARIB (Association of Radio Industries and Businesses) metadata, and camera metadata formed on the basis of settings/control information regarding the video camera that took the pictures.

The KLV metadata covers LTC (longitudinal time code) established as reference data, UBs (user bits) that determine the character of the LTC, and UMID (unique material identifier) constituting a globally unique ID.

The ARIB metadata refers to the metadata standardized by ARIB. The metadata thus standardized is overlaid onto standard communication interface arrangements such as SDI (Serial Digital Interface). The camera metadata denotes illustratively IRIS control values, white/black balance mode data, and lens-related information regarding the zooming and focusing of the lenses.

Of the metadata types mentioned above, those deemed mandatory include LTC/UB and UMID of the KLV data structure and other KLV metadata (e.g., essence marks constituting electronic mark data characterizing images or voices). The metadata types considered optional are illustratively ARIB metadata, camera metadata, and GPS data.

In FIG. 5, the metadata about each frame is called frame metadata, and the metadata regarding each clip is called clip metadata. The frame metadata is recorded cyclically in synchronism with the video and audio signals being recorded. The clip metadata is recorded randomly.

The frame metadata is described illustratively in a language based on BiM (Binary Format for Metadata) following decimal-to-binary conversion from XML (extensible markup language) files. Typically, the mandatory and optional data portions are combined to make up a single file so that the metadata may be written to and read from the disk in a simplified manner by an optical disk drive (i.e., in order to reduce processing burdens on the CPU). Furthermore, the frame metadata is output periodically in synchronism with video and audio signals. As such, the frame metadata needs to be handled in real time and is thus placed in the BiM format that involves only a small amount of data.

The frame metadata is furnished in a single file per frame for three reasons: file management involving frames is complex; it is necessary to check mounting and dismounting times; and as with ARIB metadata, the frame metadata needs to be output on a frame interleave basis. The optional metadata such as camera metadata should preferably be described in text so that it can be read easily by a personal computer or like equipment.

The frame metadata is recorded per frame close to material data (AV data) to the optical disk. This arrangement minimizes the occurrence of seek operations at read time, thereby implementing high-speed reproduction.

The clip metadata is described in a suitable XML-based language. A single file format is used to handle LTC/UMID, GPS data, and other metadata. For example, other metadata includes a starting time code, discontinuity time code information (information having a set of frames counted from the beginning), a starting extended UMID source pack (time of day of recording, recording location, user information, etc.), and an extended UMID source pack of discontinuities. The single file arrangement is intended to let the disk drive perform write and read operations to and from the optical disk in an appreciably simplified manner (so as to reduce the processing burdens on the CPU) as mentioned above. Furthermore, the clip metadata represents the attributes of each clip and of the result of its editing. As such, the clip metadata need not be handled in real time and is thus placed in the XML format. The one-file-per-clip arrangement is adopted to circumvent problems that may result from changing numbers of variable points in LTC/UMID or from the GPS data size varying over time. The GPS data and other metadata should preferably be described in text so that it can be read easily by a personal computer or like equipment.

Unlike the frame metadata recorded per frame, the clip metadata is written to the recording media 90 in increments of clips. This arrangement reduces the time it takes to read the clip metadata and allows particular frames to be retrieved at high speed based on the time code, recording time of day, recording location, or user information. The clip metadata may be either recorded collectively in a specific area of the recording media 90 or written in distributed fashion to a plurality of areas on the media 90.

The compression parameter and other parameters related to signal processing may be inserted as metadata on either a frame-by-frame or a clip-by-clip basis.

What follows is a description of the UMID, one of the diverse categories of metadata. The UMID is an ID (identification information) that identifies each material (audio and video data, etc.) in a globally unique manner. The UMID also servers as unique ID information regarding each frame.

FIGS. 6A, 6B, 6C and 6D illustrate how the UMID is structured. The UMID defined in SMPTE 330M is a globally unique ID assigned to each item of material data. Two types of UMID are defined here: a basic UMID and an extended UMID.

Figures 6A, 6B:
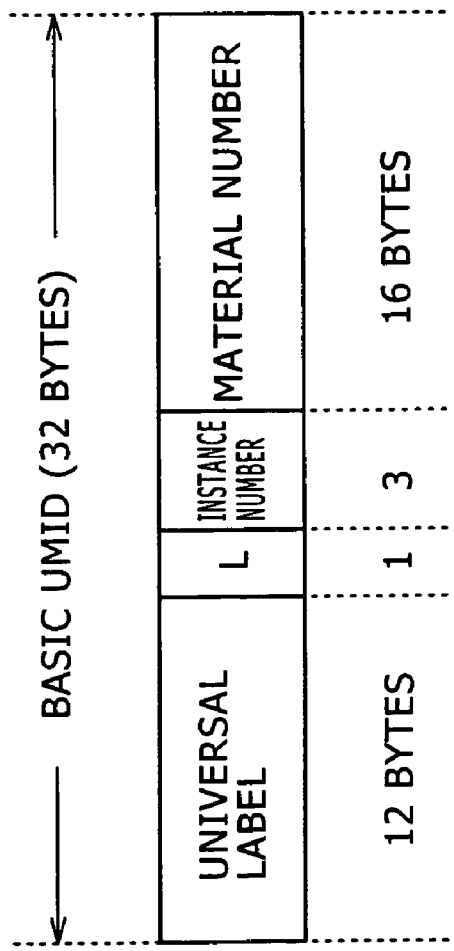
FIGS. 6A, 6B, 6C and 6D are explanatory views of UMID included in the compressed signal of the embodiment.

FIG. 6A shows a data format of the basic UMID. As illustrated, the format includes a 12-byte universal label in which the first through the tenth bytes make up a fixed byte sequence. The 11th and 12th bytes in the universal label constitute data of 04h and 11h illustratively when video and audio data are recorded simultaneously to form basic materials. The format also includes a one-byte length (L) field that denotes the bit length of the video and audio materials having been recorded. In the case of basic materials, the format includes a three-byte instance number (Inst. No.) formed by 00h, 00h, and 00h.

Figures 6C, 6D:
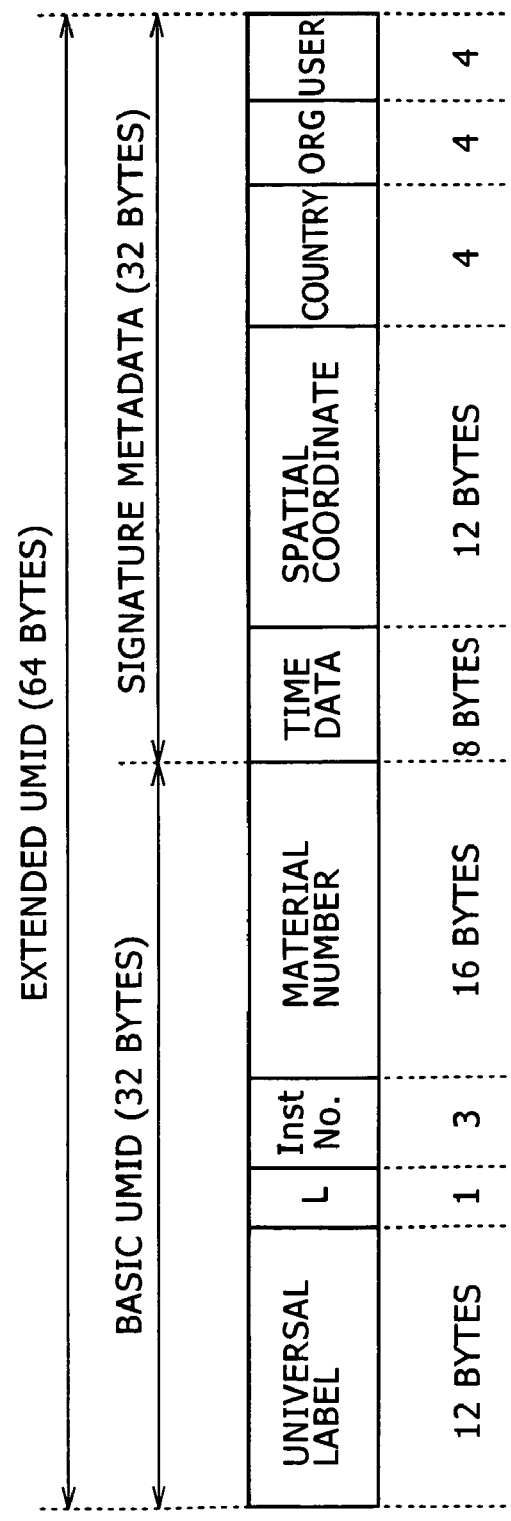

A 16-byte material number, another part of the format, is made up of a time snap and a random number as shown in FIG. 6B, and of a machine node as indicated in FIG. 6C.

The time snap is a an eight-byte field denoting a frame, seconds, minutes, and hours. These values are derived illustratively from time information generated by an internal time code generator. If basic materials are to be picked up by a camcorder such as the image pickup apparatus 1, then the time snap information is recorded per frame to the recording media 90 constituted by a magnetic tape or the like.

If the date of interest is Mar. 30, 2001, that date is converted first to a Julian date. With the time zone found to be that of, say, Japan from the established time settings, the eight-byte time snap is arranged to have 97h.

The random number (Rnd) is made up of a lower byte and an upper byte. These values are obtained illustratively from a self-propelled M-sequential generator running on software. The random number varies from scene to scene.

The machine node is constituted by six bytes as shown in FIG. 6C. Each of the bytes in the machine node to be used on the network is defined in EUI 48 (Extended Unique Identifier). The first three bytes of the machine node constitute a value unique to an organization. The remaining three bytes form a machine-specific serial number unique to the apparatus being used (e.g., camcorder).

FIG. 6D shows a data format of the extended UMID defined in SMPTE 330M. The extended UMID is constituted by 64 bytes in total: a 32-byte basic UMID shown in FIG. 6A, supplemented with a 32-byte signature metadata portion.

The signature metadata, as shown in FIG. 6D, is made up of eight-byte time data, 12-byte spatial coordinates, a four-byte country code, a four-byte organization code, and a four-byte user code. The material number is constituted by the eight-byte time snap, two-byte random number, and five-byte machine node.

4. Hardware Structure of the Editing Apparatus

Figure 7:
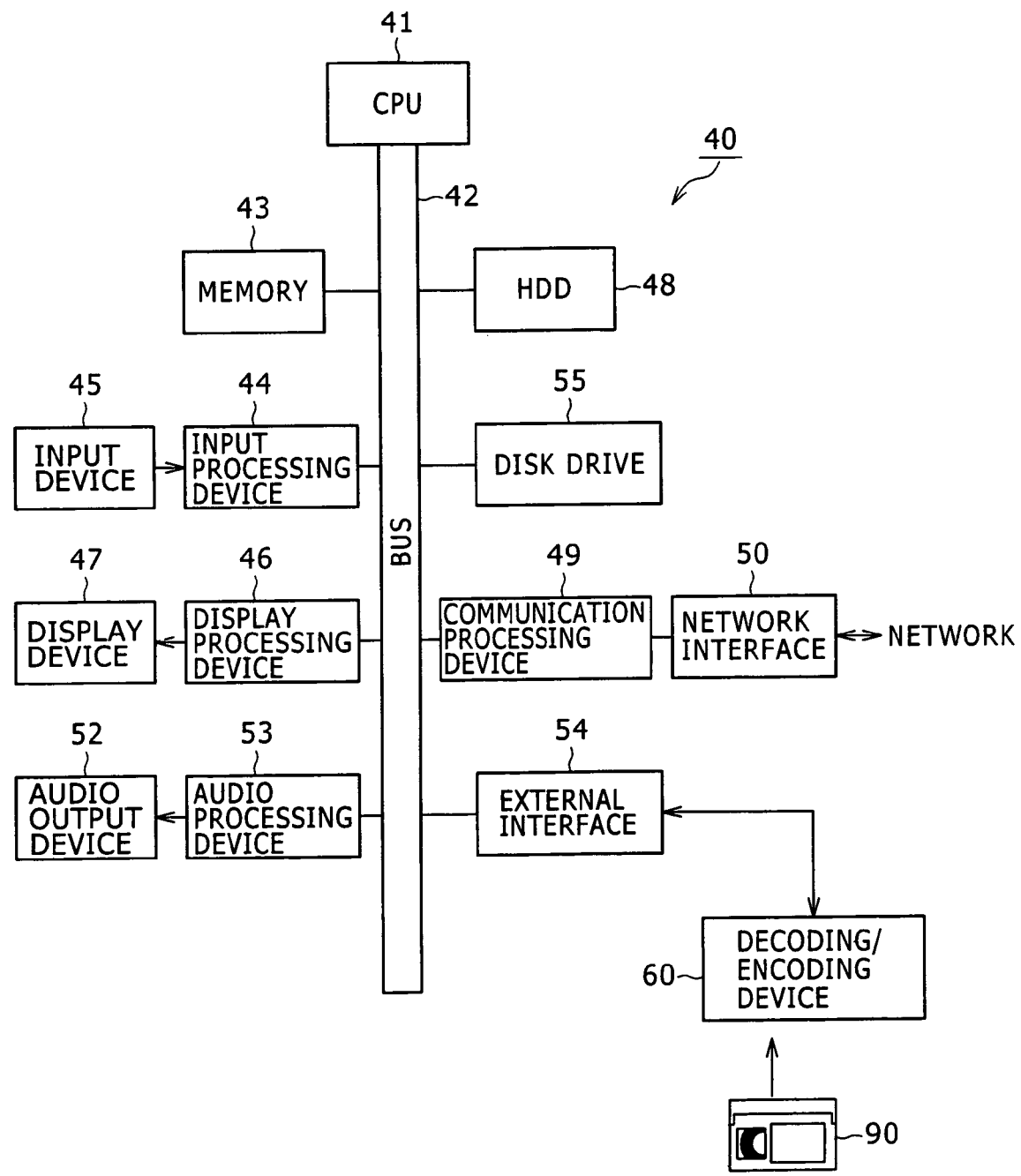
FIG. 7 is a block diagram showing a typical structure of the editing apparatus embodying the present invention.

How the editing apparatus 2 is structured will now be described with reference to FIGS. 7 and 8. As discussed above by referring to FIG. 2, the editing apparatus 2 has the edit-use decoding device 2a, editing device 2b, and edit-use encoding device 2c. As illustrated in FIG. 7, the editing apparatus 2 of this example is constituted by a computer 40 as well as by a decoding/encoding device 60 attached as an external device to the computer 40. In this configuration, the computer 40 functions primarily as the editing device 2, and the decoding/encoding device 60 as the edit-use decoding device 2a and edit-use encoding device 2c.

The computer 40 is a machine which has programs installed inside so as to implement the functions of the editing apparatus 2 and which carries out editing operations when the installed programs are started.

In other words, the computer 40 illustratively executes suitable software to perform editing operations on baseband video and audio signals.

In the structure of FIG. 7, a CPU 41 carries out various control and arithmetic operations based on the started programs. For example, the CPU 41 performs input and output operations with regard to the operator, and executes memory control, HDD (hard disk drive) control, network-based communications, external interface control, read-write control over disk recording media, and data operations.

The CPU 41 exchanges control signals and data with the circuits involved via a bus 42.

A memory device 43 collectively represents a RAM, a ROM, and a flash memory which are used by the CPU 41 during processing.

The ROM in the memory device 43 stores operation programs and a program loader for use by the CPU 41. The flash memory in the memory device 43 accommodates operation coefficients and parameters for use with the programs. Also in the memory device 43 is the RAM that temporarily provides a data area and a task area in which the programs are being executed.

An input device 45 is illustratively a keyboard, a mouse, a touch panel, a remote commander, a scanner and/or any other suitable input device through which the operator enters data and performs diverse operations. The input information is processed by an input processing device 44 before being sent to the CPU 41 as operational or data input. In turn, the CPU 41 carries out arithmetic and control operations on the input information.

A display device 47 is illustratively a CRT, a liquid crystal display panel, or some other suitable device that presents the operator with diverse kinds of information.

The CPU 41 supplies a display processing device 46 with display information representative of the current operating status and input status. In turn, the display processing device 46 causes the display device 47 to give displays based on the display information.

A hard disk drive (HDD) 48 offers areas in which to store various kinds of programs and data and in which to accommodate material data (video and audio) being edited or having been edited.

A communication processing device 49 under control of the CPU 41 encodes outgoing data to be transmitted and decodes received data.

A network interface 50 transmits the outgoing data encoded by the communication processing device 49 to a destination apparatus over the network. The network interface 50 further receives signals from an external device via the network and hands them over to the communication processing device 49.

The communication processing device 49 transfers the received information to the CPU 41.

A disk drive 55 is typically a drive that writes and/or reads data to and/or from such CD-type disks as CD-DA, CD-ROM and CD-R, as well as DVD-type disks including DVD-ROM, DVD-RAM and DVD-R.

If application programs and data constituting an editing apparatus are offered on a CD-ROM or a DVD-ROM, that disk is loaded into the disk drive 55. The programs and data may then be installed from the loaded disk.

An external interface 54 connects to a peripheral device through IEEE 1394, USB or SCSI arrangements so as to conduct data communications.

A device equivalent to the disk drive 55 may be connected as a peripheral device. An external HDD may be connected to accommodate programs and necessary data. Obviously, a printer and/or a scanner can also be connected. A LAN may be formed in conjunction with other information processing apparatuses.

An audio processing device 53 processes audio data for output to the operator. Specifically, the audio data is fed to an audio output device 52 such as speakers or a headphone terminal for the eventual audio output.

Some models of the audio processing device 53 and audio output device 52 are capable of outputting voice data which is part of material data or which was added to the material data during editing. Naturally, the audio data reproduced from the disk by the disk drive 55 or audio files retrieved from the HDD 48 or from other storage locations may also be output.

The decoding/encoding device 60 is connected via the external interface 54 illustratively as an external device of the computer 40.

The decoding/encoding device 60 is structured illustratively as shown in FIG. 8. In the decoding/encoding device 60, a CPU 61 controls the configured devices and performs arithmetic operations based on activated programs. In particular, the CPU 61 controls write and read operations to and from the recording media 90 and regulates operations such as those of decoding compressed signals into baseband signals, encoding baseband signals into compressed signals, and extracting metadata.

The CPU 61 exchanges control signals and data with the circuits involved by way of a bus 68.

A memory 62 collectively represents a RAM, a ROM, and a flash memory which are used by the CPU 61 during its processing.

The ROM in the memory 62 stores operation programs and a program loader for use by the CPU 61. The flash memory in the memory 62 accommodates operation coefficients and parameters for use with the programs. Also in the memory 62 is the RAM that temporarily provides a data area and a task area in which the programs are being executed.

A media drive 63 under control of the CPU 61 writes and reads data to and from the recording media 90 such as a magnetic tape cassette.

Also under control of the CPU 61, a data processing device 69 and a data buffer 64 perform signal processing that is needed in the encoding/decoding device 60.

For example, a compressed signal reproduced by the media drive 63 is placed temporarily into the data buffer 64. The data processing device 69 decodes the compressed signal from the data buffer 64 into a baseband signal. After the decoding, the baseband signal is again placed into the data buffer 64.

Furthermore, the data processing device 69 extracts metadata from compressed signals, places metadata into the data buffer 64, embeds UMIDs in baseband signals, and generates outgoing data to be transmitted to the server 3.

An edited baseband signal supplied from the computer 40 is placed temporarily into the data buffer 64. The data processing device 69 encodes the baseband signal from the data buffer 64 into a compressed signal. The compressed signal is sent to the media drive 63 while being stored into the data buffer 64 at the same time. The media drive 63 records the compressed signal to the recording media 90.

An input device 66 is illustratively a keyboard, a touch panel, a remote commander, and/or any other suitable input device through which the operator enters data and performs diverse operations. The input information is processed by an input processing device 65 before being sent to the CPU 61 as operational or data input. In turn, the CPU 61 carries out arithmetic and control operations on the input information.

An external interface 67 connects to a peripheral device through IEEE 1394, USB or SCSI arrangements so as to conduct data communications. For example, baseband signals are exchanged with the computer 40 of FIG. 7 and command signals are sent and received between the CPU 61 and CPU 41 by way of the external interface 67.

Whereas the structures shown in FIGS. 7 and 8 are only examples, the function blocks explained above with reference to FIG. 3 are implemented illustratively using the configured devices as follows:

The decoding function 201 and metadata extracting function 202 of the edit-use decoding device 2a are implemented by the media drive 63, data buffer 64, and data processing device 69 operating under control of the CPU 61.

The baseband processing function 203 of the edit-use decoding device 2a is implemented by the data buffer 64, data processing device 69, and external interface 67 operating under control of the CPU 61.

Where the server 3 is made available for communication through the external interface 67, the UMID/parameter transmitting function 204 of the edit-use decoding device 2a is implemented by the data buffer 64, data processing device 69, and external interface 67 operating under control of the CPU 61. Alternatively, if the server is made available for communication through the network interface 50 of the computer 40, the UMID/parameter transmitting function 204 is implemented by the network communication function of the computer 40 (i.e., communication processing device 49 and network interface 50 under control of the CPU 41) as well as by the above-mentioned devices.

The data editing function 211, UMID/parameter transmitting function 212, UMID transmitting function 213, and parameter receiving function 214 of the editing device 2b are implemented by the computer 40 causing its relevant components to operate in suitable coordination.

More specifically, the data editing function 211 is carried out by the relevant software activated by the CPU 41 providing the operator with interface facilities and controlling actual editing signal processing. Baseband signals are converted for storage and editing purposes by means of the HDD 48.

The UMID/parameter transmitting function 212, UMID transmitting function 213, and parameter receiving function 214 when exchanging data with the server 3 are implemented by means of the network interface 50 or external interface 54.

The encoding function 221 of the edit-use encoding device 2c is implemented by the media drive 63, data buffer 64, and data processing device 69 operating under control of the CPU 61.

The UMID transmitting function 222 and parameter receiving function 223 of the edit-use encoding device 2c are implemented by the data buffer 64, data processing device 69, and external interface 67 operating under control of the CPU 61. Data exchanges with the server 3 are effected either directly via the external interface 67 or through the network interface 50 of the computer 40.

In the above setup, the encoding/decoding device 60 was shown performing encoding and decoding. Alternatively, an external device acting simply as a media drive may be used to write and read compressed signals to and from the recording media 90 while the functions of the edit-use decoding device 2a and edit-use encoding device 2c shown in FIG. 3 may be implemented on the side of the computer 40.

It is also possible to dispense with the general-purpose computer 40 and instead utilize dedicated hardware functions such as those of an editing apparatus equipped with processors and HDDs for editing purposes.

Any apparatus structure may be adopted as long as it permits implementation of the functions explained above with reference to FIGS. 2 and 3.

5. Hardware Structure and Database of the Server

Figure 9:
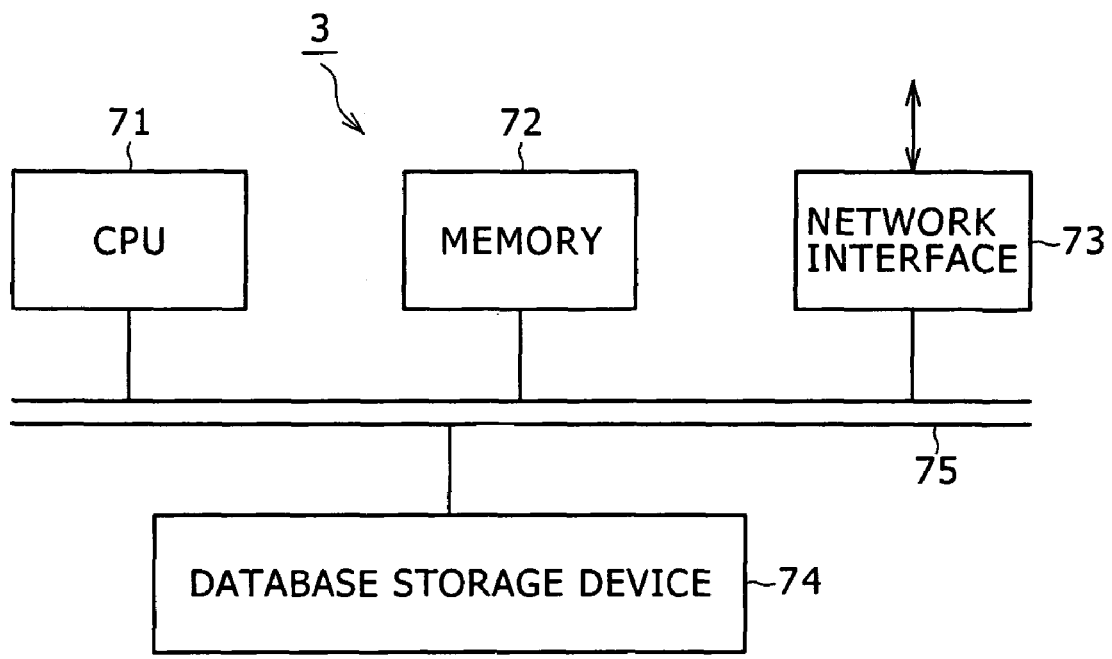
FIG. 9A is a block diagram of a server apparatus embodying the invention.
FIG. 9B is an explanatory view of a database as part of the embodiment.

FIG. 9A shows a typical structure of the server 3. As illustrated, the server 3 includes a CPU 71, a memory 72, a network interface 73, and a database storage device 74.

The CPU 71 exchanges control signals and data with the circuits involved by way of a bus 75.

The memory 72 collectively represents a RAM, a ROM, and a flash memory which are used by the CPU 71 during its processing.

The ROM in the memory 72 stores operation programs and a program loader for use by the CPU 71. The flash memory in the memory 72 accommodates operation coefficients and parameters for use with the programs. Also in the memory 72 is the RAM that temporarily provides a data area and a task area in which the programs are being executed.

The database storage device 74 is structured illustratively in the form of a HDD. This storage device 74 accommodates as part of its stored information a database 3a indicated in FIG. 2.

The network interface 73 is an interface that conducts communications illustratively with the computer 40 shown in FIG. 7 over the transmission channel 5.

Although not shown, interfacing arrangements based on the IEEE 1394, USB or SCSI standards may be provided to ensure connection with the external interfaces 54 and 67 shown in FIGS. 7 and 8.

The server 3 implements under control of the CPU 71 the data storage processing function 301, data search processing function 302, parameter transmitting function 303, and database accessing function 304 indicated in FIG. 3. The CPU 71 controls the above-mentioned functions during operation by regulating the operation programs and by performing communications through the network interface 73. More specifically, the data storage processing function 301, data search processing function 302, and parameter transmitting function 303 are implemented by the CPU 71, memory 72, and network interface 73 operating in suitable coordination. The database accessing function 304 is carried out by the database storage device 74 under control of the CPU 71.

FIG. 9B schematically shows what is contained in the database 3a formed in the database storage device 74. As illustrated, the database 3a holds compression parameters, decoding parameters, and editing parameters in correspondence with UMIDs.

As explained above with reference to FIGS. 2 and 3, when UMIDs and parameters are transmitted by the edit-unit decoding device 2a or by the editing device 2b (i.e., computer in FIG. 7 or decoding/encoding device 60 in FIG. 8) for storage into the database, the CPU 71 stores the transmitted UMIDs and parameters into the database as shown in FIG. 9B by carrying out the data storage processing function 301 and data search processing function 302.

When a UMID is transmitted by the edit-use encoding device 2c or by the editing device 2b (i.e., computer in FIG. 7 or decoding/encoding device 60 in FIG. 8) for search, the CPU 71 searches the database based on the UMID and transmits the retrieved parameters by carrying out the data search processing function 302, database accessing function 304, and parameter transmitting function 303.

6. System Operations

Figure 10:
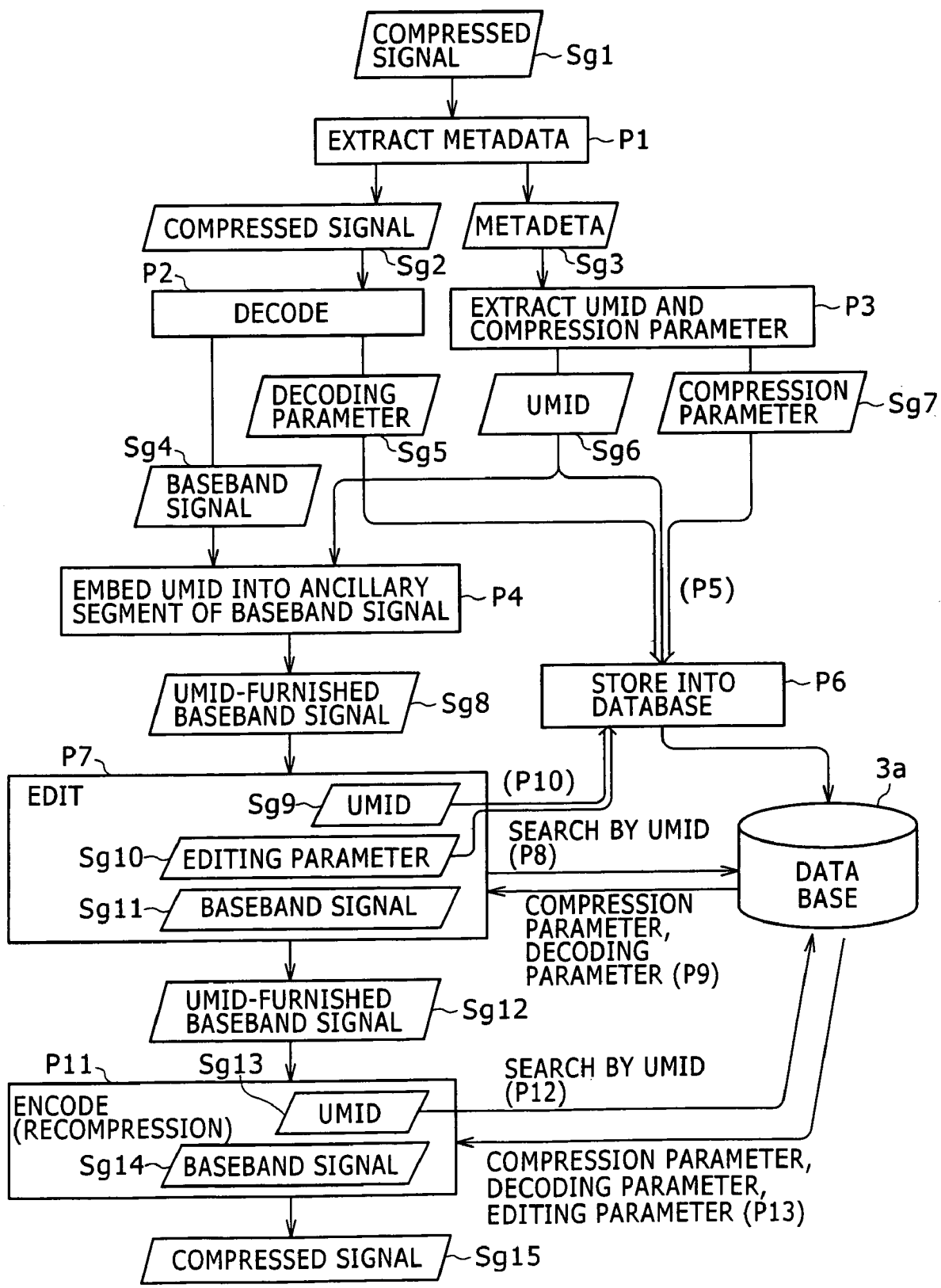
FIG. 10 is a signal flow diagram applicable to the embodiment.

Described below with reference to FIG. 10 are the system operations performed by the functions explained above in connection with FIGS. 2 and 3.

In FIG. 10, a compressed signal Sg1 denotes the signal picked up by the image pickup apparatus 1 and offered in compressed format to the editing apparatus 2 illustratively on a piece of the recording media 90.

In the editing apparatus 2, the metadata extracting function 202 of the edit-use decoding device 2a extracts metadata Sg3 from the compressed signal Sg1 (in process P1).

The decoding function 201 proceeds to decode a metadata-free compressed signal Sg2 into a baseband signal Sg4 (in process P2).

From the metadata Sg3 extracted in process P1, the metadata extracting function 202 extracts a UMID Sg6 and a compression parameter Sg7 (in process P3). The UMID Sg6 and compression parameter Sg7 are transmitted to the server 3 by the UMID/parameter transmitting function 204 (in process P5).

The transmission performed in process P5 may further entail a simultaneous transmission of a decoding parameter Sg5 that was used during the decoding (in process P2).

When the UMID Sg6 and the parameter Sg7 and Sg5 have been sent to the server 3, the data storage processing function 301 and database accessing function 304 store the UMID and parameters into the database 3a (in process P6).

The baseband processing function 203 embeds the UMID Sg6 (in process P4) into the baseband signal Sg4 created by the decoding (in process P2). This produces a UMID-supplemented baseband signal Sg8 that is transferred to the editing device 2b.

The editing device 2b imports the UMID-supplemented baseband signal Sg8. The data editing function 211 edits the imported baseband signal Sg11 (in process P7).

At this point, the editing device 2b causes the UMID transmitting function 213 to transmit to the server 3 (in process P8) the UMID Sg9 that was attached to the baseband signal.

In response, the data search processing function 302 and database accessing function 304 of the server 3 search the database 3a based on the UMID in order to retrieve the corresponding parameters. The parameter transmitting function 303 transmits the retrieved parameters (in process P9).

The parameters are received by the parameter receiving function 214 and handed over to the data editing function 211. This makes it possible to use, during data editing, the previously-employed parameters (e.g., compression and decoding parameters) corresponding to the baseband signal that is currently subject to editing.

An editing parameter Sg10 that was used during editing may also be sent along with the UMID Sg9 to the server 3 by the UMID/parameter transmitting function 212.

When the UMID Sg9 and editing parameter Sg10 have been sent to the server 3, the data storage processing function 301 and database accessing function 304 store the UMID and parameter in question into the database 3a (in process P6).

A baseband signal Sgl2 supplemented with the UMID and edited by the data editing function 211 of the editing device 2b is transferred to the edit-use encoding device 2c.

The edit-use encoding device 2c imports the edited UMID-supplemented baseband signal Sgl2 that has been transferred. The encoding function 221 encodes the imported baseband signal Sgl2 (in process P11).

At this point, the UMID transmitting function 222 of the edit-use encoding device 2c transmits to the server 3 (in process P12) the UMID Sgl3 that was attached to the baseband signal.

In response, the data search processing function 302 and database accessing function 304 of the server 3 search the database 3a based on the UMID in order to retrieve the corresponding parameters. The parameter transmitting function 303 transmits the retrieved parameters (in process P13).

The parameters are received by the parameter receiving function 223 and handed over to the encoding function 221. This makes it possible to use, during encoding, the previously-employed parameters (i.e., compression parameter, decoding parameter, and editing parameter) corresponding to the baseband signal that is currently subject to editing.

After the encoding, a compressed signal Sgl5 is output.

As described above, it is possible to reference, during data editing or encoding (recompression), previously-utilized parameters to execute processing in such a manner as to prevent the degradation in picture quality.

It is well known that a suitable device for recompression such as the edit-use encoding device 2c can compress picture data with high quality by analyzing the parameters used in the past. With this embodiment, there is no need for parameter analysis because the previous parameters can be obtained from the server 3. This contributes to reducing the strains of encoding.

The baseband signal being edited need only be supplemented with the UMID. There is no need to insert parameters into the baseband signal. That means the load on signal transmission is alleviated appreciably.

The above-described system may utilize the parameters listed below for storage and retrieval of data in correspondence with the UMIDs. The parameters may be employed illustratively as follows:

<Parameters Available for Compression Encoding (Compression Parameters)>
  Parameters representing complexity information about pictures: These parameters may be used in recompression encoding.
  Parameters representing color information indicating illustratively the preponderance of red: These parameters may also be used in recompression encoding.
  Parameters representing information about detected scene changes: These parameters may also be used in recompression encoding.

<Parameters Available for Encoding and Decoding (Compressing Parameters and Decoding Parameters)>
  Picture type parameters: If a picture type parameter for re-encoding is arranged to coincide with that of the previous compression encoding, the degradation in picture quality is minimized during the re-encoding.
  Motion vector parameters: If a motion vector parameter for re-encoding is arranged to coincide with that of the previous compression encoding, the degradation in picture quality is minimized during the re-encoding, and there is no need to detect motion compensation.
  Quantization value parameters: If a quantization value parameter for re-encoding is arranged to coincide with that of the previous encoding, the degradation in picture quality is minimized during the re-encoding at the same bit rate.
  DCT type parameters: If a DCT (discrete cosine transform, a type of orthogonal transformation for transforming signals into frequency components) type parameter for re-encoding is arranged to coincide with that of the previous encoding, the degradation in picture quality is minimized during the re-encoding.
  VBV occupation rate parameters: If a VBV (video buffering verifier, a virtual decoder connected conceptually to the output of an encoder) occupation rate parameter is made available, nondestructive editing is carried out with ease.

<Parameters Available for Editing (Editing Parameters)>
  Invalidation of color information parameters: Because color correction before the upcoming re-encoding invalidates the color information derived from the previous encoding, it is appropriate to invalidate the color information parameter currently in effect. (Thus the storing of the data in question into the database 3a involves invalidating the past color information parameter being stored.)
  Invalidation of effect parameters: Because special-effects processing such as wipe before the upcoming re-encoding invalidates most of the information acquired from the previous encoding, it is appropriate to invalidate the color information parameter currently in effect. (Thus the storing of the data in question into the database 3a involves invalidating the past parameters being stored.)
  Scene change parameters: In-points and out-points detected during cuts reveal scene changes at these points. That means there is no further need to detect scene changes over the range encompassing the detected points.

Illustratively, it is appropriate to store the above-described parameters into the database 3a in view of system processing.

Obviously, the above parameters are not limitative of the invention. Many other processing parameters may conceivably be adopted. In addition to such processing parameters, other kinds of metadata may be stored into the database 3a to permit UMID-based data retrieval.

What has been described above is a system capable of referencing diverse kinds of metadata including processing parameters in conjunction with baseband signals into which metadata other than UMIDs need not be inserted. It is also feasible to store numerous items of information in large quantities into the database 3a (i.e., without incurring increased burdens on baseband signal transmission). This makes it possible conceivably to expand the content of the database 3a in such a manner as to include diverse kinds of information that may be used in system processing.

While preferred embodiments of this invention have been described using specific terms, such description is for illustrative purposes only. It is to be understood that changes and variations in terms of system configuration, terminal structure, system functionality, parameter composition table content, and manipulation of the composition table may be made without departing from the spirit or scope of the claims that follow.

For example, the recording media 90 may be practiced not only in the form of magnetic tapes and optical disks but also as memory cards such as flash memories or other types of media. Any media may be used as long as they have a sufficient capacity to accommodate video and audio data and permit the video and audio data as well as the parameter composition table to be written and read thereto and therefrom. As another alternative, the recording media 90 may be dispensed with to make way for a system capable of exchanging compressed signals with external entities in wired or wireless fashion.

The image pickup apparatus 1 in FIG. 1 may be given the ability to gain access to the server 3 and furnished with the UMID/parameter transmitting function. That modification will allow the image pickup apparatus 1 to transmit UMIDs and compressed parameters to the database 3a for storage therein.

Obviously, the edit-use encoding device 2c may include the UMID/parameter transmitting function by which to transmit the parameters used during encoding to the server together with the corresponding UMIDs for storage into the database.

The output apparatus 4 in FIG. 1 and other processing apparatus downstream of the editing stage may also be modified to access the database 3a and acquire information in correspondence with desired UMIDs from there.

Industrial Applicability

According to the present invention, as described above, parameter information such as compression, decoding, and editing parameters is stored into the database in conjunction with corresponding unique information (UMID). Unique information is also added to material data (baseband signal) that has been decoded (from the compressed format) for editing purposes before the material data is transmitted.

It follows that upon editing or re-encoding of the material data, the parameter information used in the past regarding the data of interest may be retrieved from the database using the corresponding unique information as the key. This arrangement permits editing and re-encoding of the material data with a minimum of degradation in picture quality. Illustratively, pictures with little deterioration in quality can be obtained from the editing.

The decoded material data to be transmitted need not be furnished with its parameter information; the corresponding unique information need only be attached to the outgoing data. This arrangement alleviates the strains of data transmission.

Furthermore, as described, the parameter information about the processing performed in the past is collected in the database in conjunction with unique information identifying the corresponding material data. This makes it possible for devices and apparatus handling material data to utilize previously-employed parameter information about the data extensively and for more generalized purposes.

The invention claimed is:

1. A data editing system comprising:
    decoding means for decoding encoded material data into decoded material data while extracting additional information from said encoded material data and extracting unique information from the extracted additional information in order to output a signal constituted by said decoded material data supplemented with said unique information;
    database means for storing into an electronic database said unique information in correspondence with predetermined processing parameter information, the processing parameter information indicating one or more editing processes performed on said decoded material data supplemented with said unique information; and
    editing means for performing predetermined editing on said signal output by said decoding means while acquiring from said database means the processing parameter information corresponding to said unique information, said editing performed in accordance with said processing parameter information.

2. The data editing system according to claim 1, further comprising encoding means for encoding said signal edited by said editing means while acquiring from said database means said processing parameter information corresponding to said unique information for use in said encoding.

3. The data editing system according to claim 1, wherein said processing parameter information which corresponds to said unique information and which is stored in said database is a compression parameter previously included in said additional information extracted by said decoding means.

4. The data editing system according to claim 1, wherein said processing parameter information which corresponds to said unique information and which is stored in said database is a decoding parameter used in the decoding performed by said decoding means.

5. The data editing system according to claim 1, wherein said processing parameter information which corresponds to said unique information and which is stored in said database is an editing parameter used in the editing performed by said editing means.

6. A data editing method comprising the steps of:
    decoding encoded material data into decoded material data, extracting additional information from said encoded material data, and extracting unique information from the extracted additional information in order to output a signal constituted by said decoded material data supplemented with said unique information;
    storing into an electronic database said unique information in correspondence with predetermined processing parameter information, the processing parameter information indicating editing processing performed on said decoded material data supplemented with said unique information; and
    performing predetermined editing on said signal output in said decoding step while acquiring from said database the processing parameter information corresponding to said unique information for use in said editing.

7. The data editing method according to claim 6, further comprising the step of encoding said signal edited in said editing step while acquiring from said database said processing parameter information corresponding to said unique information for use in said encoding.

8. The data editing method according to claim 6, wherein said processing parameter information which corresponds to said unique information and which is stored in said database is a compression parameter previously included as said additional information extracted in said decoding step.

9. The data editing method according to claim 6, wherein said processing parameter information which corresponds to said unique information and which is stored in said database is a decoding parameter used in the decoding performed in said decoding step.

10. The data editing method according to claim 6, wherein said processing parameter information which corresponds to said unique information and which is stored in said database is an editing parameter used in the editing performed in said editing step.

11. A data editing system, comprising:
    a decoding unit configured to extract a baseband signal and a unique identifier associated with the baseband signal from a first compressed signal;
    an editing unit configured to receive the unique identifier and the baseband signal from the decoding unit and to perform one or more editing processes on the baseband signal in accordance with one or more editing parameters associated with the unique identifier;

an electronic database unit configured to receive the unique identifier and the one or more editing parameters from the editing unit and to store the unique identifier and the one or more editing parameters, the one or more editing parameters being stored in association with the unique identifier; and an encoding unit configured to receive the unique identifier and the edited baseband signal from the editing unit, to encode the baseband signal to output a second compressed signal, and to retrieve the one or more editing parameters associated with the unique identifier from the database unit by supplying the unique identifier to the database unit.

12. The data editing system according to claim 11, wherein the decoding unit is configured to supply a compression parameter associated with the first compressed signal and the unique identifier to the database unit, and the encoding unit is configured to retrieve the compression parameter and to encode the edited baseband signal based on the compression parameter and the one or more editing parameters.

13. The data editing system according to claim 11, wherein the first compressed signal is an audio-visual signal, and the editing unit is configured to perform one or more audio-visual editing processes on the baseband signal.

14. The data editing system according to claim 11, wherein the database unit is configured to store at least one previous editing parameter used in a previous editing of the baseband signal, and the editing unit is configured to retrieve the at least one previous editing parameter from the database unit and to perform one or more editing processes in accordance with the one or more editing parameters and the at least one previous editing parameter.

15. The data editing system according to claim 11, wherein the database unit is configured to store at least one previous editing parameter used in a previous editing of the baseband signal, and the encoding unit is configured to retrieve the at least one previous editing parameter from the database unit and to encode the edited baseband signal in accordance with the one or more editing parameters and the at least one previous editing parameter.

* * * * *